United States Patent [19]

Brown et al.

[11] 4,077,498

[45] Mar. 7, 1978

[54] MECHANICALLY ACTUATED DISK BRAKE WITH SERVO ACTION

[75] Inventors: Donald Dean Brown, Thiensville; Jere Sanders Culp, Menominee Falls, both of Wis.

[73] Assignee: Kelsey-Hayes Co., Romulus, Mich.

[21] Appl. No.: 717,252

[22] Filed: Aug. 24, 1976

[51] Int. Cl.² .............................................. F16D 55/46
[52] U.S. Cl. .................. 188/72.2; 188/72.7; 188/72.9
[58] Field of Search ............. 188/70 R, 70 B, 72.2, 188/72.7, 72.8, 72.9, 73.3, 18 A, 73.1, 140 A; 192/70.23, 70.24, 93 R, 93 A

[56] References Cited

U.S. PATENT DOCUMENTS

| | | | |
|---|---|---|---|
| 2,526,143 | 10/1950 | Lambert | 188/72.2 |
| 3,651,897 | 3/1972 | Hahn | 188/72.7 X |
| 3,837,438 | 9/1974 | Hollnagel | 188/72.2 |

*Primary Examiner*—Trygve M. Blix
*Assistant Examiner*—Douglas C. Butler
*Attorney, Agent, or Firm*—Harness, Dickey & Pierce

[57] ABSTRACT

A mechanically actuated, spot type disk brake, having a servo action regardless of the direction of rotation of the associated brake rotor. The brake includes a slidably supported caliper and a pair of brake shoes, at least one of which is mounted for limiting axial, radial and rotary movement. The mechanical actuator comprises a device that moves the brake pad in a radial direction to achieve actuation. A cam construction translates radial movement of the brake pad into axial movement for operating the brake. The same cam construction also translates rotary movement into axial movement for achieving self energization.

11 Claims, 3 Drawing Figures

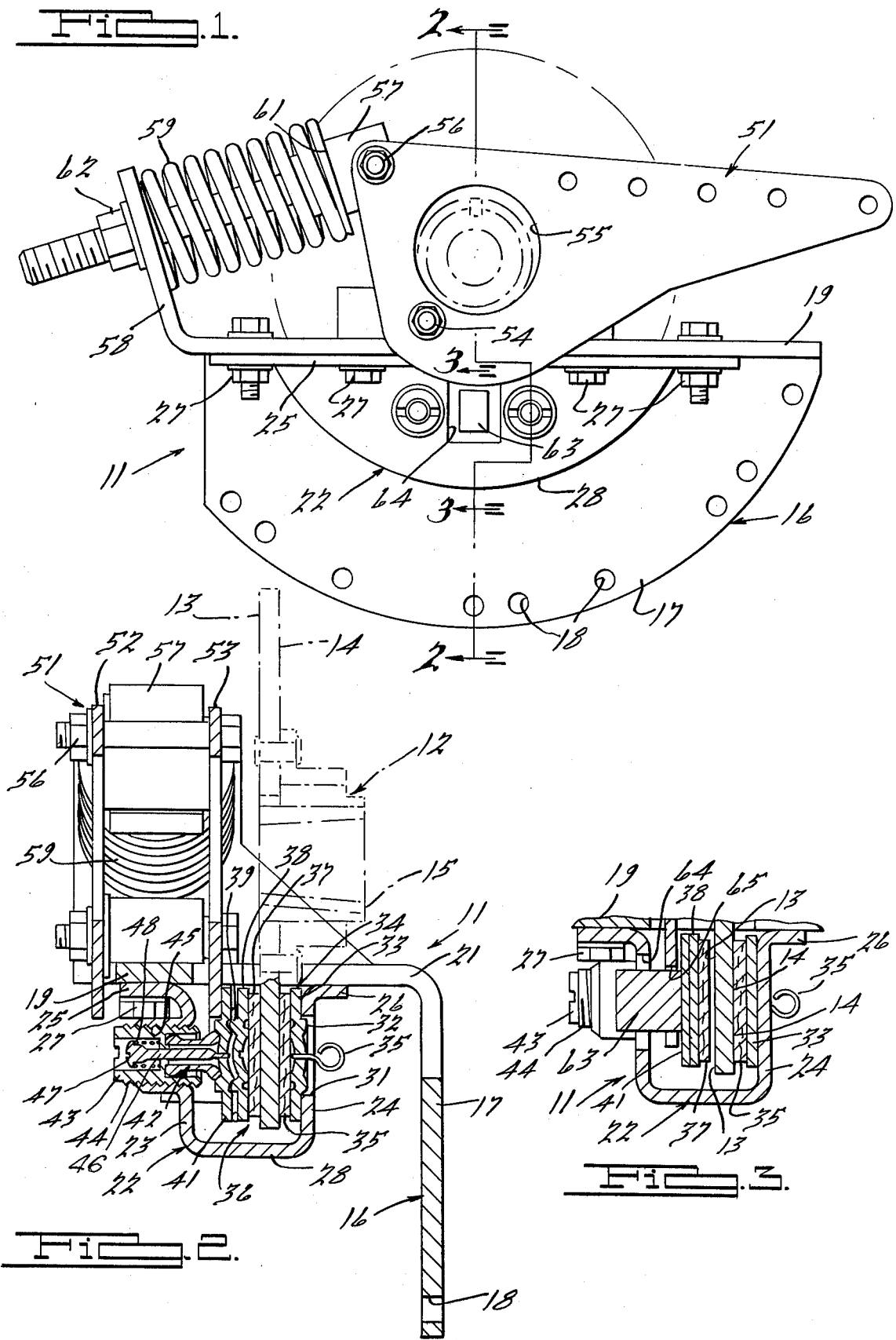

4,077,498

MECHANICALLY ACTUATED DISK BRAKE WITH SERVO ACTION

BACKGROUND OF THE INVENTION

This invention relates to an improved mechanically actuated disk brake and more particularly to an improved mechanically actuated spot type disk brake having a servo action.

In U.S. Pat. No. 3,768,603, entitled "Tilting Pin with Spring Return", issued Oct. 30, 1973 in the name of Neil Hoffman, and assigned to the assignee of this application, there is disclosed a mechanically actuated disk brake having a cam arrangement interposed between the brake and its support for achieving servo action upon operation. As is well known, it is desirable to provide some structure for achieving self energization in mechanically operated disk brakes, since such brakes are not inherently self energizing. Although the brake disclosed in the aforenoted patent is particularly advantageous, the servo effect is achieved only when the associated brake rotor is rotating in a given direction.

In U.S. Pat. No. 2,526,143, entitled "Cam Actuated Disk Brake", issued Oct. 17, 1950 in the name of Homer T. Lambert, there is disclosed a disk type brake, which appears to be capable of servo action regardless of the direction of rotation of the rotor. This brake, however, is not of the spot type in that it employs a brake lining that is substantially coextensive with the brake rotor. Also, this brake relies upon a rotor construction that is permitted to slide axially upon its supporting shaft.

It is, therefore, a principal object of this invention to provide an improved mechanically actuated spot type disk brake that is capable of servo action regardless of the direction of rotation of the rotor.

It is another object of the invention to provide an improved, sliding caliper type of disk brake that has a self energizing effect.

SUMMARY OF THE INVENTION

This invention is adapted to be embodied in a self energizing spot type disk brake that is adapted to cooperate with a rotatably supported brake rotor. The brake includes a brake housing juxtaposed to the brake rotor and a brake pad carried by the housing and juxtaposed to a braking surface of the rotor. The brake pad has a braking area that is substantially smaller than the rotor braking surface. The brake pad is supported for limited movement axially, radially and in the direction of rotation of the rotor relative to the brake housing. Cam means are interposed between the brake pad and the brake housing for exerting a force on the brake pad in an axial direction when the brake pad moves relative to the brake housing in either the radial or rotary directions. Actuating means are providing for moving the brake pad radially whereby the cam means actuates the brake pad axially into engagement with the rotor braking surface, the initial limited rotation of the brake pad with the brake rotor also adds to the axial effect.

BRIEF DESCRIPTION OF THE DRAWINGS

FIG. 1 is a side elevational view of a spot type disk brake embodying this invention.

FIG. 2 is a cross-sectional view taken along the line 2—2 of FIG. 1.

FIG. 3 is a cross-sectional view taken along the line 3—3 of FIG. 1.

DETAILED DESCRIPTION OF THE PREFERRED EMBODIMENT

In the drawings, the reference numeral 11 indicates generally a mechanically actuated spot type disk brake embodying this invention. The brake 11 is adapted to cooperate with a brake rotor, shown partially in phantom and identified generally by the reference numeral 12. The rotor 12 has opposed braking surfaces 13 and 14 and is supported for rotation about an axis by means including a hub 15.

Juxtaposed to the rotor 12 is a fixed mounting bracket, indicated generally by the reference numeral 16. The mounting bracket 16 has a flange 17 in which a plurality of drilled openings 18 are formed so as to facilitate attachment to any suitable fixed support (not shown). A horizontally extending leg 19 is integrally connected to the leg 17, and the two legs are formed with an opening 21 that passes a portion of the rotor 12.

A formed caliper assembly, indicated generally by the reference numeral 22, is supported for sliding movement in an axial direction relative to the axis of rotation of the rotor 12, upon the leg 19, as will be described. The caliper 22 has a first leg portion 23 juxtaposed to the rotor braking surface 13 and a second leg portion 24 juxtaposed to the rotor braking surface 14. Each of the leg portions 23 and 24 terminates at its radially inner end in a respective flange 25 and 26, that is slidably engaged on the underside of the supporting member leg 19. Bolt and nut assemblies 27 pass through the flange 25 and leg 19 with sufficient clearance to permit axial movement of the caliper assembly 22 on the leg 19. The caliper assembly 22 is completed by a bridge portion 28 that integrally connects the legs 23 and 24.

The caliper leg 24 is formed with a central opening 31 that receives an embossment 32 formed on the backing plate 33 of a brake pad 34. A spring clip 35 is also affixed to the brake pad 34 and completes the connection of the pad 34 to the caliper 22 and specifically the leg 24. The brake pad 34 has a frictional lining surface 35 that is adapted to cooperate with the rotor braking surface 14, in a manner which will be described.

A braking pad 36 is associated with the caliper leg 23 and has a frictional lining 37 that is adapted to engage the rotor braking surface 13. The brake pad 36 has a backing plate 38 with a central embossment 39 that is received in a corresponding cavity formed in a further backing plate 41. A pair of self energizing cam means in the form of tilting pins, each of which is indicated generally by the reference numeral 42 are interposed between the caliper leg 22 and the brake pad 36 for both actuating the brake assembly and for generating a servo effect. The tilting pins 42 are of substantially the same construction described in aforenoted U.S. Pat. No. 3,768,603. Each pin 42 bears at one end against the backing plate 41 and is received at its other end in a sleeve 43. The sleeves 43 have external threads 44 that are received in internal threads 45 formed in the caliper leg 23 so as to permit adjustment for wear.

Return spring arrangements, as was described in the aforenoted U.S. Pat. No. 3,768,603 are also provided for returning the brake to its at rest position. This arrangement includes a pin 46 that is fixed at one end to the backing plate 41 and which has an enlarged head 47 that extends into a bore of the sleeve 43. A coil compression spring 48 urges the pin 46 and associated brake pad 36 to its released position.

Operation of the brake assembly is provided by a mechanically actuated lever cam 51. The cam 51 is comprised of a pair of spaced, interconnected arms 52 and 53. The arms 52 and 53 are pivotally supported relative to the mounting bracket 16 by means of a pivot bolt 54. The arms are formed with enlarged central openings 55 to pass the shaft which drives the rotor 12 (not shown). The arms 52 and 53 are also connected by a bolt assembly 56 which passes through the head of a threaded rod 57 to provide a release spring arrangement. The rod 57 extends through an upstanding end 58 of the support leg 19 and is encircled by a coil compression spring 59. The spring 59 bears against a shoulder 61 formed on the rod 57 and the bracket end 58. A nut assembly 62 permits adjustment of the angular position of the lever 51 and preload of the spring 59 for shipping and installation. The nut 62 is released upon installation so as to permit the spring 59 to expand sufficiently to pivot the lever 51 in a clockwise direction to apply the brake, as will be described. The brake is normally held in a released position by applying a force on the lever 51 to rotate it in a counter-clockwise direction through any suitable operator (not shown).

The brake pad 36 and specifically the backing plate 41 has an axially extending tab 63 (FIGS. 1 and 3) that extends through an opening 64 in the caliper leg 23. The lever 51 has a cam portion 65 that is adapted to engage the projection 63 and move the brake pad 36 in a radially outward direction to effect engagement of the brake, as will now be described.

OPERATION

The Figures illustrate the brake 11 in its released position. In this condition, the spring 59 is compressed by the actuating lever 51 moving in a counter-clockwise direction to a released position. At the same time, the springs 48 will have effected a release of the brake pads 34 and 36.

When it is desired to actuate the brake assembly 11, the lever 51 is pivoted in a clockwise direction by the spring 59. The engagement of the lever cam 65 with the brake pad projection 63 will cause the brake pad 36 to be moved radially outwardly. The tilting pins 42 will, upon this movement, generate an axial force on the brake pad 36. At the same time, a reactive force will be exerted on the caliper assembly 22 to cause it to shift to the left as viewed in FIGS. 2 and 3. Thus, the brake pad 34 will also be moved axially into engagement with the rotor 12 and specifically its braking surface 14. Thus, radial movement of the brake pad 36 is transmitted into axial movement of both brake pads 36 and 34 to effect engagement with the rotor braking surfaces 13 and 14, respectively.

When the brake pad 36 engages the rotor braking surface 13 it will tend to rotate in the same direction as the rotor 12. A limited amount of such movement is permitted by the tilting pin assemblies 42. However, this rotary movement also causes axial movement for the same reason as radial movement did. Thus, a self energizing or servo effect is created. It should be noted that this results regardless of the direction of rotation of the rotor 12.

When the lever 51 is rotated in a counter-clockwise direction compressing the spring 59 the springs 48 will effect release of the brakes.

It is to be understood that the foregoing description is that of a preferred embodiment of the invention. Various changes and modifications may be made without departing from the spirit and scope of the invention as defined by the appended claims.

We claim:

1. A self energizing spot type disk brake adapted to cooperate with a rotatably supported brake rotor, said disk brake comprised of a brake housing juxtaposed to the brake rotor, a brake pad carried by said housing and juxtaposed to a braking surface of the associated rotor, said brake pad having a braking area substantially smaller than the rotor braking surface, said brake pad being supported for limited movement from a normal retracted position axially, radially and in the direction of rotation of said rotor relative to said brake housing, said support of said brake pad being effective to permit movement of said brake pad in either a clockwise direction of rotation or a counterclockwise direction of rotation relative to said brake housing, cam means interposed between said brake pad and said brake housing for exerting a force on said brake pad in an axial direction when said brake pad moves relative to said brake housing in either the radial direction or either of said rotary directions, and actuating means for moving said brake pad substantially only in a radial direction whereby said cam means actuates said brake pad axially into engagement with the brake rotor and for generating a self energizing effect upon said brake pad upon its rotation with the rotor regardless of the direction of rotation of the associated rotor.

2. A self energizing spot type disk brake as set forth in claim 1 wherein the cam means includes a tilting pin.

3. A self energizing spot type disk brake as set forth in claim 1 wherein the brake pad is positioned on one side of the rotor and further including a second brake pad positioned on the other side of the rotor and operated by the actuating means.

4. A self energizing spot type disk brake as set forth in claim 3 wherein the brake housing comprises a caliper operably supporting the brake pads.

5. A self energizing spot type disk brake as set forth in claim 4 wherein the caliper is supported for sliding movement, the second brake pad being affixed to said caliper, operation of the actuating means creating a reactive force upon said caliper for sliding said caliper and actuating said second brake pad.

6. A self energizing spot type disk brake as set forth in claim 5 further including a fixed support having an axially extending flange, said caliper being slidably supported upon said flange.

7. A self energizing spot type disk brake as set forth in claim 1 wherein the actuating means comprises a lever supported for pivotal movement and having cam means thereon for radially moving the brake pad.

8. A self energizing spot type disk brake as set forth in claim 7 wherein the brake pad has an outstanding flange engaged by the lever cam means.

9. A self energizing spot type disk brake as set forth in claim 8 wherein the brake pad is positioned on one side of the rotor and further including a second brake pad positioned on the other side of the rotor and operated by the actuating means.

10. A self energizing spot type disk brake as set forth in claim 9 wherein the brake housing comprises a caliper operably supporting the brake pads.

11. A self energizing spot type disk brake as set forth in claim 10 wherein the caliper is supported for sliding movement, the second brake pad being affixed to said caliper, operation of the actuating means creating a reactive force upon said caliper for sliding said caliper and actuating said second brake pad.

* * * * *